Feb. 5, 1929.
S. A. JOHNSON
1,701,112
CLASP
Filed March 26, 1928
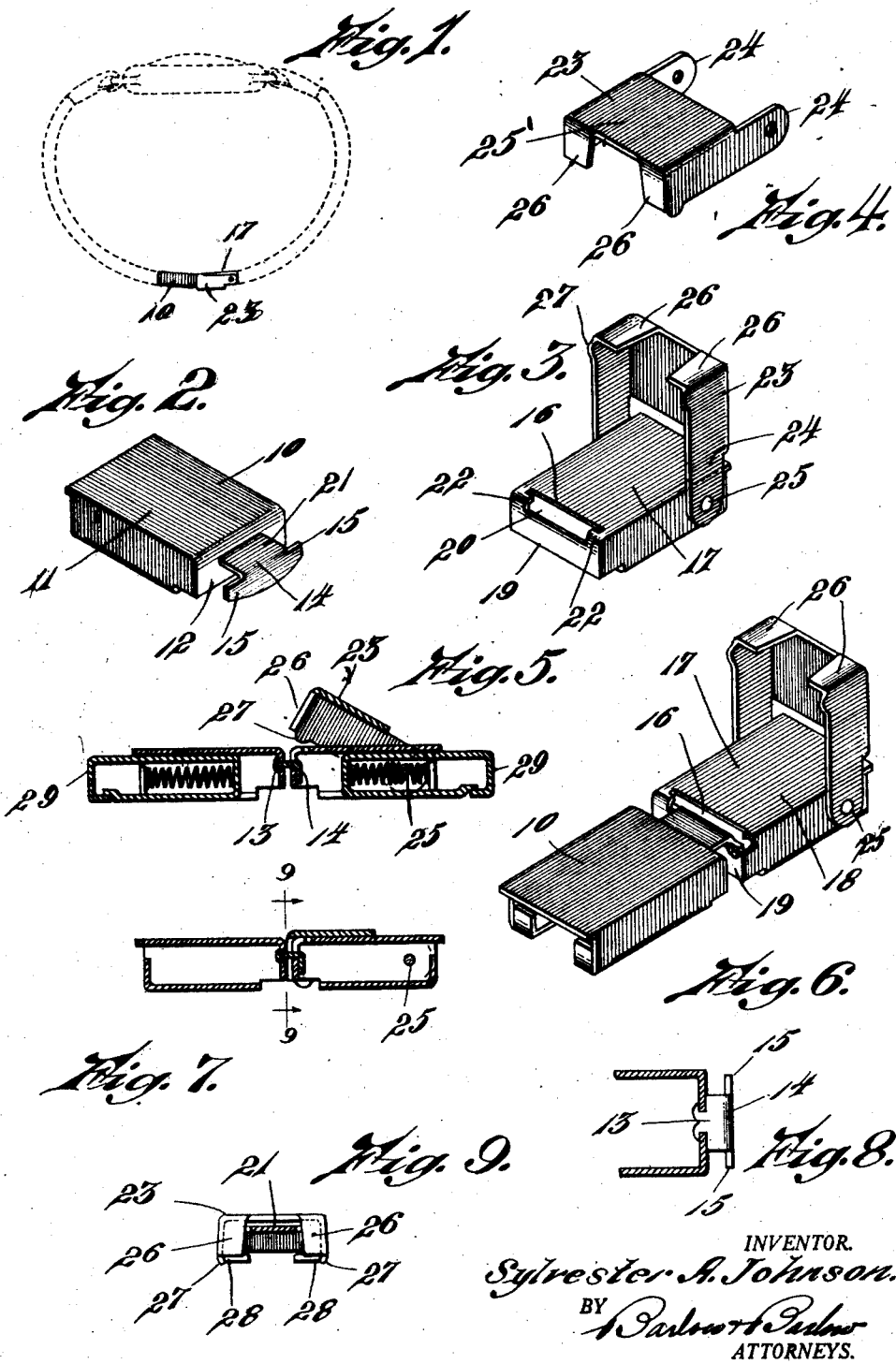
INVENTOR.
Sylvester A. Johnson.
BY
ATTORNEYS.

Patented Feb. 5, 1929.

1,701,112

UNITED STATES PATENT OFFICE.

SYLVESTER A. JOHNSON, OF NORTH PROVIDENCE, RHODE ISLAND, ASSIGNOR TO SPEIDEL BROS., OF PROVIDENCE, RHODE ISLAND, A FIRM COMPOSED OF EUGEN SPEIDEL, FREDERIC SPEIDEL, BOTH OF PFORZHEIM, GERMANY, AND EDWIN F. M. SPEIDEL AND ALBERT E. R. SPEIDEL, BOTH OF CRANSTON, RHODE ISLAND.

CLASP.

Application filed March 26, 1928. Serial No. 264,852.

This invention relates to an improved clasp for detachably connecting together opposite ends of a chain; and the object of this invention is to so arrange the adjacent end units of the chain that they may be readily connected and locked together to be disengaged from each other at the will of the user.

A further object of the invention is to provide a clasp of this character for use on an extendible chain having guide links and slide links extendible from opposite ends of the guide links, a hook member being on one guide link and means being provided on the opposite guide link to which the hook may be attached and locking means being also provided for preventing inadvertent detachment of this hook member.

With these and other objects in view, the invention consists of certain novel features of construction, as will be more fully described, and particularly pointed out in the appended claims.

In the accompanying drawings:

Fig. 1 is a side elevation showing the chain in dotted lines with its middle portion detachably connected together by my improved clasp.

Fig. 2 is a perspective view showing the attaching hook extending from the end wall of one of the end guide links.

Fig. 3 is a perspective view of the opposite end guide link showing the slot thru its upper wall permitting the hook to enter and engage the end wall thereof; also showing the lock member in raised position on this link.

Fig. 4 is a perspective view showing a detail of the lock for the hook.

Fig. 5 is a sectional view showing the two end guide links connected together by a hook with the lock member partially closed and showing the slide links extendible from opposite ends of said guide links.

Fig. 6 is a perspective view of the links shown in Fig. 5 and illustrating the wall of the slotted link partially broken away to show the T-head of the hook in position therein.

Fig. 7 shows the end links as connected together by the hook, and the lock member as moved down into locked position.

Fig. 8 is a detail showing the means for securing the attaching hook to the end wall of one of the guide links.

Fig. 9 is a section on line 9—9 of Fig. 7 illustrating the flanges of the lock member as extending over the end of the slot link to prevent the hook from being inadvertently detached from the slot link also showing the resilient side tabs of this lock member as arranged to spring over the bottom edges of the slot link.

It is found in the practical construction and operation of clasps of this character for connecting together the adjacent ends of links of an extendible chain, of advantage to arrange the connecting members so as not to interfere with the extendibility of the link units being connected, and to accomplish this in a simple and effective way, I have arranged the end guide links so that their slide links will be extendible from their opposite ends, and I have connected a hook to the abutting end of one of these guide links and have provided a slot in the adjacent end of the opposite guide link into which the hook may be inserted to engage the end wall thereof and I have pivoted a lock member on the slot link to fit down over the slot after the hook has been inserted therein to lock the hook in attached position to prevent accidental separation of the chain which is of importance particularly where this chain forms a bracelet for securing a watch in position on the wrist of the wearer; and the following is a detailed description of the present embodiment of my invention and showing one construction of bracelet links whereby these advantageous results may be accomplished:

With reference to the drawings, 10 designates the hook link of my improved clasp, which in this instance is shown to be of box form having a top wall 11 and an end wall 12. This end wall 12 is pierced to receive the shank portion 13 of the hook 14, which shank is split and riveted, as best illustrated in Fig. 8, to permanently attach the hook to this end wall. The head portion of this hook is preferably provided with laterally extending retaining shoulders 15 to be better retained in the slot 16 of the adjacent end link 17.

This slot link is also provided with a top wall 18 and an end wall or cross bar 19 and the slot 16 is formed thru this top wall of a width to receive the T-shaped head of the hook and the end wall 19 is slotted as at 20 with a narrow opening to receive the shank portion 21 of the hook, whereby the lateral extensions 15 when in position will be engaged by the overhanging lips 22 in the slot and so assist in preventing accidental detachment of the hook of one link from the slot of the opposite link.

In order to further assist in locking this hook into the slot link 17, I have provided a lock member 23 which comprises a pair of side arms 24 pivoted at 25 to the sides of the slot link 17 and the forward portion of this lock is provided with a top wall 25' and spaced end flanges 26 which extend over the end of the link 17 to straddle the shank 21 of the hook and so close the slot 16 thru which the hook entered. Also the side walls of this lock member are provided with inwardly set resilient tabs 27 which are designed to snap around the bottom edge 28 of the link 17, see Fig. 9, to further assist in securing this lock member in locked position.

Both of these links 10 and 17 are constructed with improved means by which they are connected together and which means do not interfere with the sliding action of the slide links 29, which is of importance in order to obtain the maximum amount of extension in the bracelet.

My device is very simple and practical in construction and is effective in its operation and by its use the maximum extendibility of the chain or bracelet is obtained and at the same time a clasp for the bracelet is provided which permits its middle portion to be readily detached when desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A clasp for a chain comprising two separable end links, one having a cross bar and the other having a hook arranged to extend around said cross bar, the cross bar link also having a pivoted lock member to swing over the hook and secure it in engaged position.

2. A clasp for an extendible chain comprising two abutting end guide links, slide links extendible from opposite ends of said guide links, a hook on one guide link, a cross bar on the other guide link engaged by said hook, and means on one of the members for releasably securing the hook in engaged position.

3. A clasp for an extendible chain comprising two abutting end guide links, slide links extendible from opposite ends of said guide links, a hook on one guide link, an engaging member on the other guide link engaged by said hook, and a lock member pivoted to the hook engaging guide link arranged to close over the engaged hook to prevent accidental disengagement thereof.

4. A clasp for an extendible chain comprising two abutting end links of box shape, each having top and end walls, slide links extendible from opposite ends of said box links, a hook extending from the end wall of one box link, the opposite box link being slotted thru its top wall to receive the hook of the other link to engage its adjacent end wall, and a pivoted lock member on the slotted link to releasably retain said hook in its slot.

5. A clasp for an extendible chain comprising two abutting end links of box shape, each having top and end walls, slide links extendible from opposite ends of said box links, a T-shaped hook extending from the end wall of one box link, the opposite box link having a T-shaped slot in its top wall to receive said correspondingly shaped hook to engage its end wall, and a lock member pivoted to the slotted link to close over the end of the slot and the hook therein to releasably retain the hook in attached position.

In testimony whereof I affix my signature.

SYLVESTER A. JOHNSON.